(12) United States Patent
Yoshida (10) Patent No.: US 6,433,892 B1
(45) Date of Patent: Aug. 13, 2002

(54) FACSIMILE APPARATUS

(75) Inventor: Takehiro Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/433,573

(22) Filed: Nov. 4, 1999

(30) Foreign Application Priority Data

Nov. 6, 1998 (JP) .......................................... 10-315665
Nov. 18, 1998 (JP) .......................................... 10-328166

(51) Int. Cl.⁷ .............................. G06F 15/00; G06K 1/00
(52) U.S. Cl. ..................... 358/296; 358/1.14; 358/1.17; 358/1.18
(58) Field of Search ............................... 358/1.13, 1.16, 358/400, 401, 468, 434, 435, 436, 474, 296, 1.17, 1.18; 399/1.14, 1, 2, 374

(56) References Cited

U.S. PATENT DOCUMENTS

| | | | |
|---|---|---|---|
| 5,282,050 A | * | 1/1994 | Ishizuka et al. ............. 358/400 |
| 5,289,290 A | * | 2/1994 | Suzuki et al. ............... 358/468 |
| 5,408,340 A | * | 4/1995 | Edamura .................... 358/468 |
| 5,532,847 A | * | 7/1996 | Maruyama .................. 358/498 |
| 5,642,205 A | * | 6/1997 | Kassmann .................. 358/436 |
| 5,815,289 A | | 9/1998 | Yoshida et al. ............. 358/468 |
| 5,826,133 A | * | 10/1998 | Saito et al. ..................... 399/2 |
| 6,275,308 B1 | * | 8/2001 | Yoshida ....................... 358/474 |

OTHER PUBLICATIONS

U.S. application Ser. No. 09/432,698, filed Nov. 2, 1999.
U.S. application Ser. No. 09/436,642, filed Nov. 9, 1999.
U.S. application Ser. No. 09/342,189, filed Jun. 29, 1999.

* cited by examiner

Primary Examiner—Kimberly A. Williams
(74) Attorney, Agent, or Firm—Fitzpatrick, Cella, Harper & Scinto (57) ABSTRACT

This invention has as its object to provide a facsimile apparatus capable of both side transmission, both side reading, and both side recording, which can appropriately record image data received in the both side transmission mode, and can prevent recording sheets from being wasted.

When the transmitter designates both side transmission, control is made to start recording upon completion of reception of data for at least two pages, and when the transmitter does not designate both side transmission, control is made to start recording upon completion of reception of data for at least one page. When compulsory both side recording is selected at the receiver end, control is made to start recording upon completion of reception of data for at least two pages.

17 Claims, 12 Drawing Sheets

FACSIMILE APPARATUS

BACKGROUND OF THE INVENTION

1. Field of the Invention

The present invention relates to a facsimile apparatus capable of both side transmission and both side recording of image data.

2. Related Background Art

In a conventional facsimile apparatus capable of both side recording, when both side transmission is designated, the front side of a recording sheet of the first page is recorded first upon completion of reception of data for the first page, and the back side of the recording sheet of the first page is recorded next upon completion of reception of data for the second page.

However, in the above prior art, when both side transmission is underway and any error occurs during reception of data for the fourth page, operation at the receiver end stops when recording on the front and back sides of a recording sheet of the first page, and on the front side of a recording sheet of the second page are complete.

Upon receiving image data from another transmitter, since the received data must be printed and print operation is started, even when the communication that has caused the error during reception of data for the fourth page is restarted, the data for the fourth page cannot be recorded on the back side of the recording sheet of the second page, and the data for the third page is recorded twice, thus wasting resources, i.e., recording sheets.

In the above prior art, upon executing reception control, the receiver end determines that both side originals are sent in ascending order of pages, and in the order of front and back sides in units of pages.

More specifically, the receiver end executes reception control assuming that data is sent in the order of the front side of an original of the first page, its back side, the front side of an original of the second page, and its back side.

However, in the prior art, if the transmitter end sends only front side data of all originals first, and then sends only back side data of all the originals, the receiver end prints out all the front side data of the originals, and then prints out the back side data of the received originals, thus requiring a double number of recording sheets, and wasting resources considerably.

SUMMARY OF THE INVENTION

It is an object of the present invention to provide a facsimile apparatus which can appropriately record image data received in the both side transmission mode, and can prevent recording sheets from being wasted.

DETAILED DESCRIPTION OF THE PREFERRED EMBODIMENTS

First Embodiment

Figure 1:
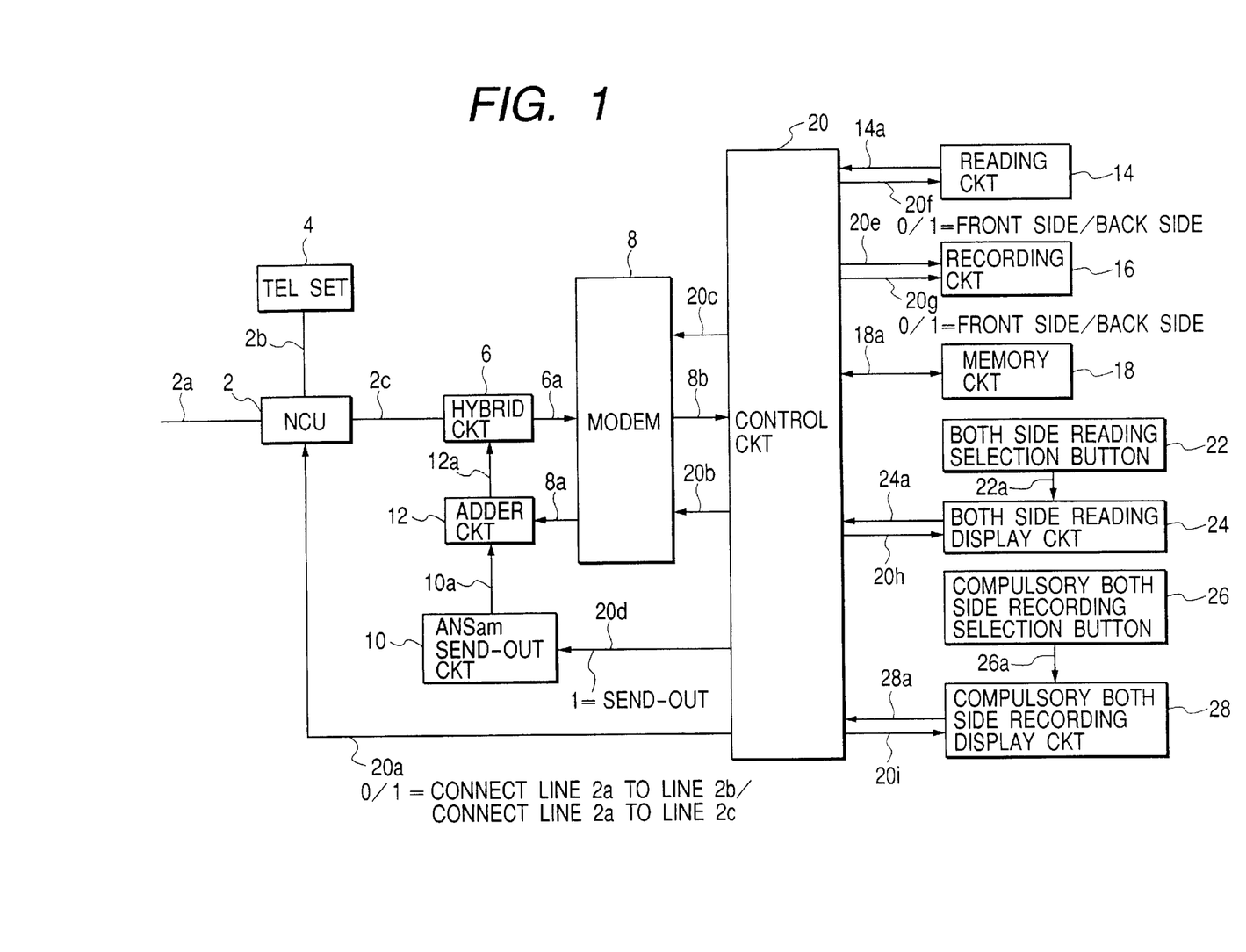
FIG. 1 is a block diagram showing the first embodiment of the present invention.

FIG. 1 is a block diagram showing the arrangement of a facsimile apparatus according to the first embodiment of the present invention.

An NCU (network control unit) 2 is connected to a terminal on a telephone line and performs connection control of a telephone exchange network, switches to a data communication path, and maintains a loop, in order to use a telephone network for data communication and the like. The NCU connects a telephone line 2a to the side of a telephone set 4 if the signal level (signal line 20a) from a control circuit 20 is "0"; and connects the telephone line 2a to the facsimile apparatus side if the signal level is "1". Normally, the telephone line 2a is connected to the telephone set 4 side.

A hybrid circuit 6 separates a transmission system signal from a reception system signal. The hybrid circuit 6 sends a transmission signal from an adder circuit 12 onto the telephone line 2a via the NCU 2. Also, the hybrid circuit 6 receives a signal from a partner apparatus via the NCU 2, and sends the received signal to a modem 8 via a signal line 6a.

The modem 8 modulates and demodulates based on the ITU-T recommendations V.8, V.21, V27ter, V.29, V.17, and V.34, and each transmission mode is designated by a signal line 20c. The modem 8 receives a signal output onto a signal line 20b, and outputs modulated data onto a signal line 8a. Also, the modem 8 receives a reception signal output onto the signal line 6a, and outputs demodulated data onto a signal line 8b.

An ANSam send-out circuit 10 sends out an ANSam signal. When a signal of signal level "1" is output onto a signal line 20d, the circuit 10 sends out an ANSam signal onto a signal line 10a; when a signal of signal level "0" is output onto the signal line 20d, the circuit 10 does not output any signal onto the signal line 10a.

The adder circuit 12 receives data on the signal line 8a and that on the signal line 10a, and outputs the sum onto a signal line 12a.

A reading circuit 14 reads an image on the front side of an original when a signal of signal level "0" is output onto a signal line 20f; or reads an image on the back side of an original when a signal of signal level "1" is output onto the signal line 20f. The reading circuit 14 outputs the read data onto a signal line 14a.

A recording circuit 16 records data output onto a signal line 20e in turn in units of lines. When a signal of signal level "0" is output on a signal line 20g, the circuit 16 records data on the front side of a recording sheet; when a signal of signal level "1" is output on the signal line 20g, the circuit 16 records data on the back side of the recording sheet.

A memory circuit 18 is used to store raw or encoded data of the read data, or to store received data, encoded data, or the like.

A both side reading selection button 22 is used to select a both side reading mode of an original (or a document sheet) on the transmitter end. Upon depression of this button, an ON pulse is generated on a signal line 22a.

A both side reading display circuit 24 displays that the both side reading mode is selected. When a clear pulse is generated on a signal line 20h, the circuit 24 clears its display (i.e. displays nothing). Every time an ON pulse is generated on the signal line 22a, the circuit 24 repeats "display"→"clear" (no display)→"display". When the circuit 24 displays, it outputs a signal of signal level "1" onto a signal line 24a; when the circuit 24 clears its display, it outputs a signal of signal level "0" onto the signal line 24a.

A compulsory both side recording selection button 26 is used to select a compulsory both side recording mode on the receiver end. Upon depression of this button, an ON pulse is generated onto a signal line 26a.

A compulsory both side recording display circuit 28 displays that the compulsory both side recording mode is selected. When a clear pulse is generated on a signal line 20i, the circuit 28 clears its display (i.e. displays nothing). Every time an ON pulse is generated on the signal line 26a, the circuit 28 repeats "display"→"clear" (no display) →"display". When the circuit 28 displays, it outputs a signal of signal level "1" onto a signal line 28a; when the circuit 28 clears its display, it outputs a signal of signal level "0" onto the signal line 28a.

The control circuit 20 controls the overall facsimile apparatus capable of both side transmission, both side reading, and both side recording according to this embodiment. Especially, in the embodiment of the present invention, when the both side transmission mode is designated from the transmitter end, the control circuit 20 controls to start recording upon completion of reception of data for at least two pages. On the other hand, when the both side transmission mode is not designated from the transmitter end, the control circuit 20 controls to start recording upon completion of reception of data for at least one page. Furthermore, when the compulsory both side recording mode is selected on the receiver end, the control circuit 20 controls to start recording upon completion of reception of data for at least two pages.

FIGS. 2 to 5 are flow charts showing the control flow of the control circuit 20 in this embodiment.

Figure 2:
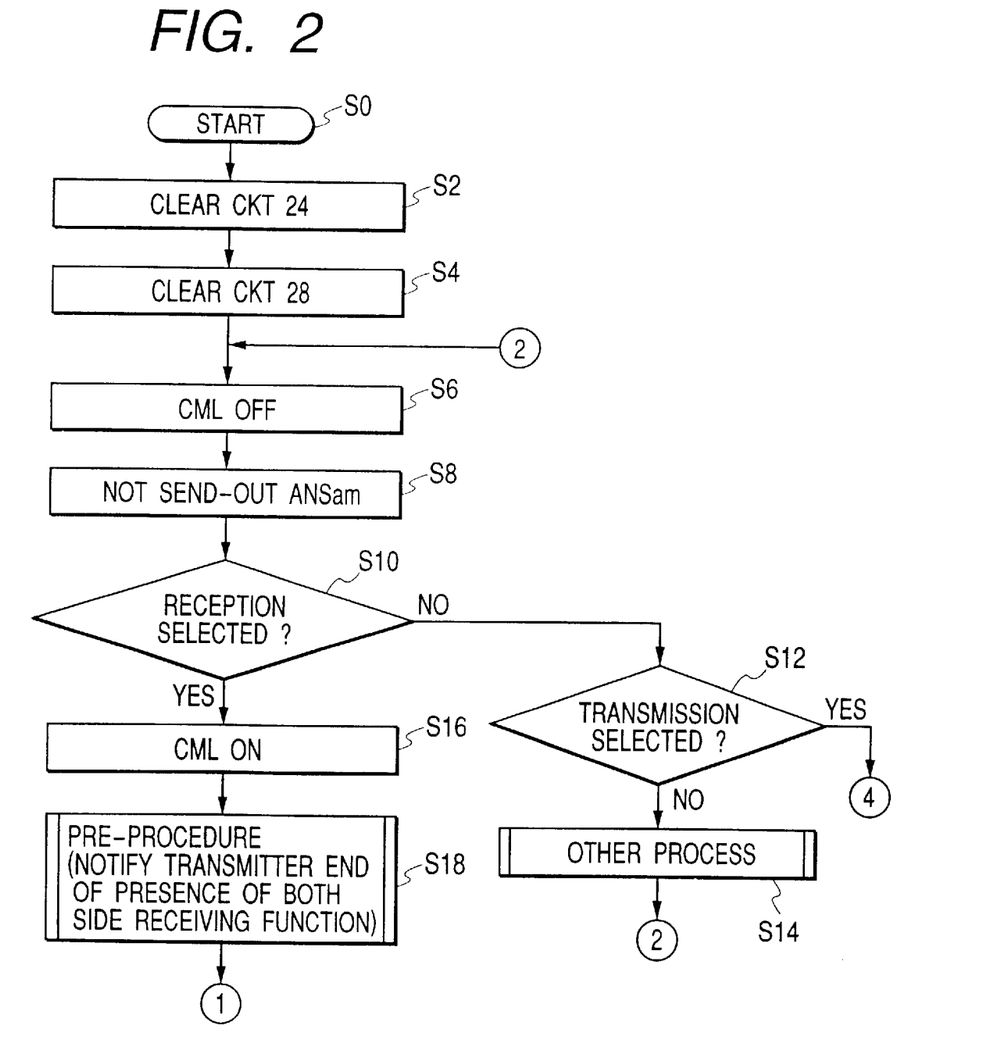
FIG. 2 is a flow chart showing operation in the first embodiment.

Referring to FIG. 2, the control circuit 20 starts operation in step SO, and generates a clear pulse onto the signal line 20h to clear the both side reading display circuit 24 in step S2. In step S4, the control circuit 20 generates a clear pulse onto the signal line 20i to clear the compulsory both side recording display circuit 28. In step S6, the control circuit 20 outputs a signal of signal level "0" onto the signal line 20a to turn off a CML. In step S8, the control circuit 20 outputs a signal of signal level "0" onto the signal line 20d to disable sending-out of an ANSam signal.

The control circuit 20 checks in steps S10 and S12 if reception/transmission is selected. If reception is selected, the flow advances to step S16; if transmission is selected, the flow jumps to step S52; if neither of them is selected, the flow advances to step S14 to execute other processes.

In step S16, the control circuit 20 outputs a signal of signal level "1" onto the signal line 20a to turn on the CML. In step S18, the control circuit 20 executes a pre-procedure. In this step, the control circuit 20 notifies the transmitter end of the presence of the both side receiving function.

The control circuit 20 checks in step S20 if the transmitter end designates the both side transmission mode in the pre-procedure. If YES in step S20, the flow advances to step S24; otherwise, the flow advances to step S22.

In step S22, the control circuit 20 receives data on the signal line 28a to check if the compulsory both side recording mode is selected at the receiver end. If YES in step S22, the flow advances to step S24; otherwise, the flow advances to step S38.

Figure 3:
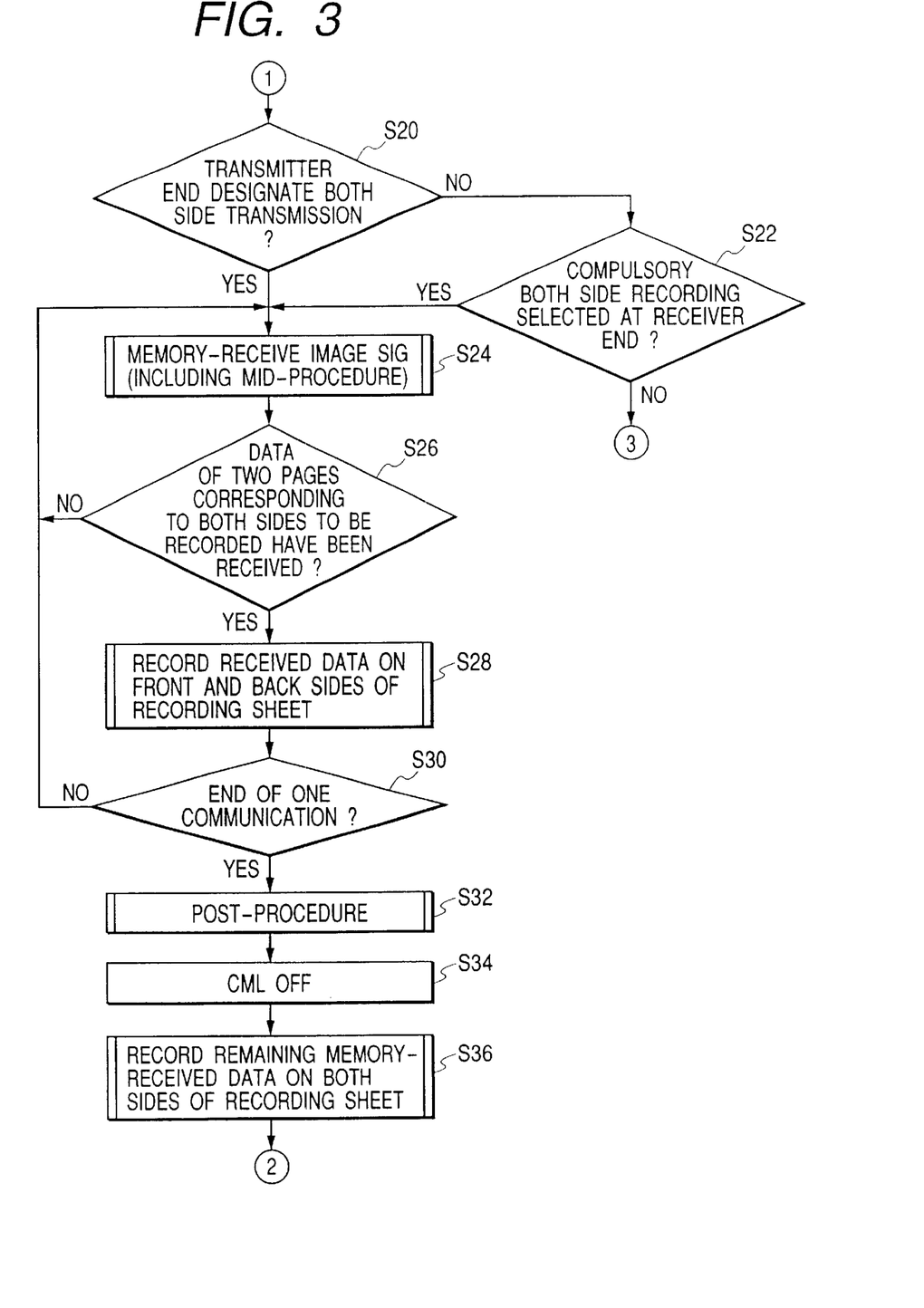
FIG. 3 is a flow chart showing operation in the first embodiment.

In step S24, the control circuit 20 memory-receives an image signal. This step includes a mid-procedure. The control circuit 20 checks in step S26 if data for two pages have been received, i.e., if data for the front and back sides to be recorded have been received. If YES in step S26, the flow advances to step S28 to record data on the front and back sides of a recording sheet via the signal line 20g; otherwise, the flow returns to step S24.

The control circuit 20 checks in step S30 if one communication has ended. If YES in step S30, the flow advances to step S32; otherwise, the flow returns to step S24. The control circuit 20 executes a post-procedure in step S32, and outputs a signal of signal level "0" onto the signal line 20a to turn off the CML in step S34. In step S36, the control circuit 20 records remaining memory-received data on both sides of a recording sheet via the signal line 20g. After that, the flow returns to step S6.

Figure 4:
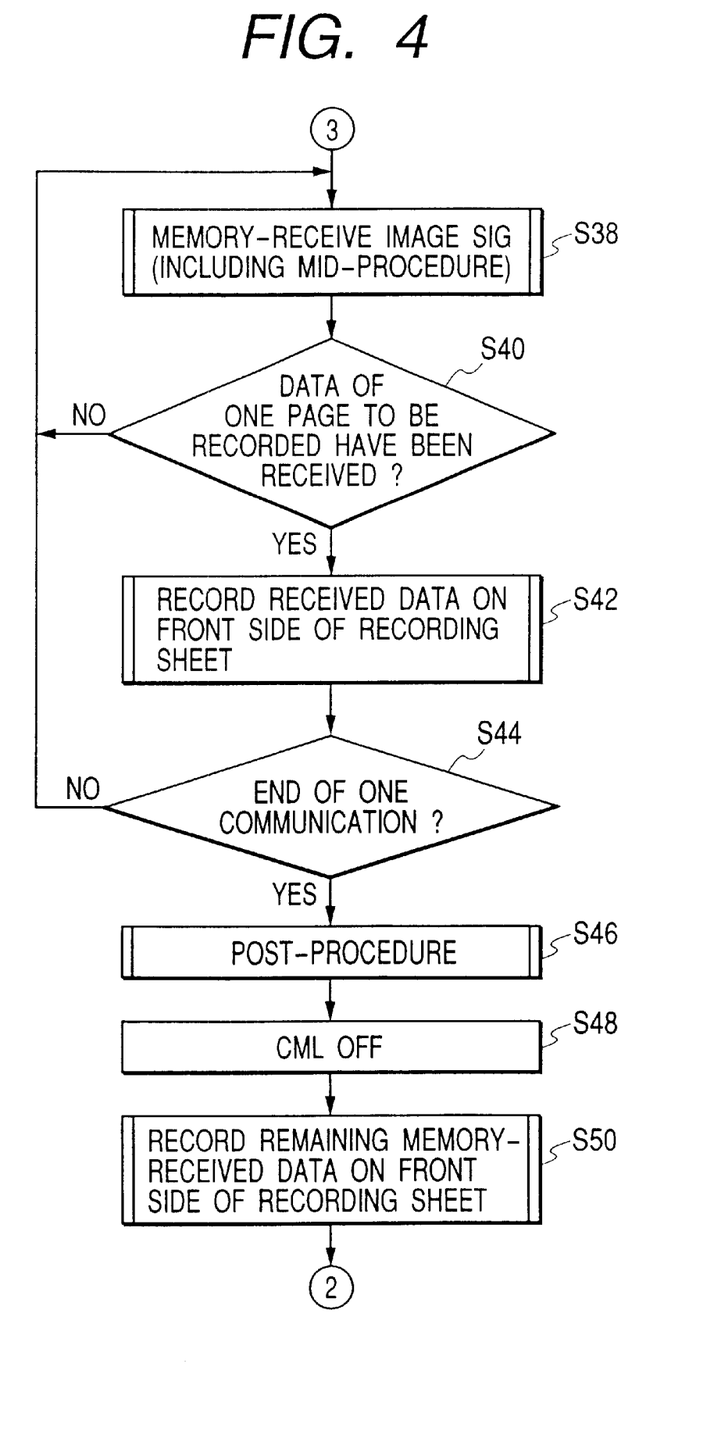
FIG. 4 is a flow chart showing operation in the first embodiment.

In step S38, the control circuit 20 memory-receives an image signal. This step includes a mid-procedure. The control circuit 20 then checks in step S40 if data for one page has been received, i.e., if data for one page to be recorded has been received. If YES in step S40, the flow advances to step S42 to record data on the front side of a recording sheet via the signal line 20g, and the flow then advances to step S44; otherwise, the flow returns to step S38.

The control circuit 20 checks in step S44 if one communication has ended. If YES in step S44, the flow advances to step S46; otherwise, the flow returns to step S38.

The control circuit 20 executes a post-procedure in step S46, and outputs a signal of signal level "0" onto the signal line 20a to turn off the CML in step S48. In step S50, the control circuit 20 records remaining received data on the front side of a recording sheet via the signal line 20g. After that, the flow returns to step S6.

Figure 5:
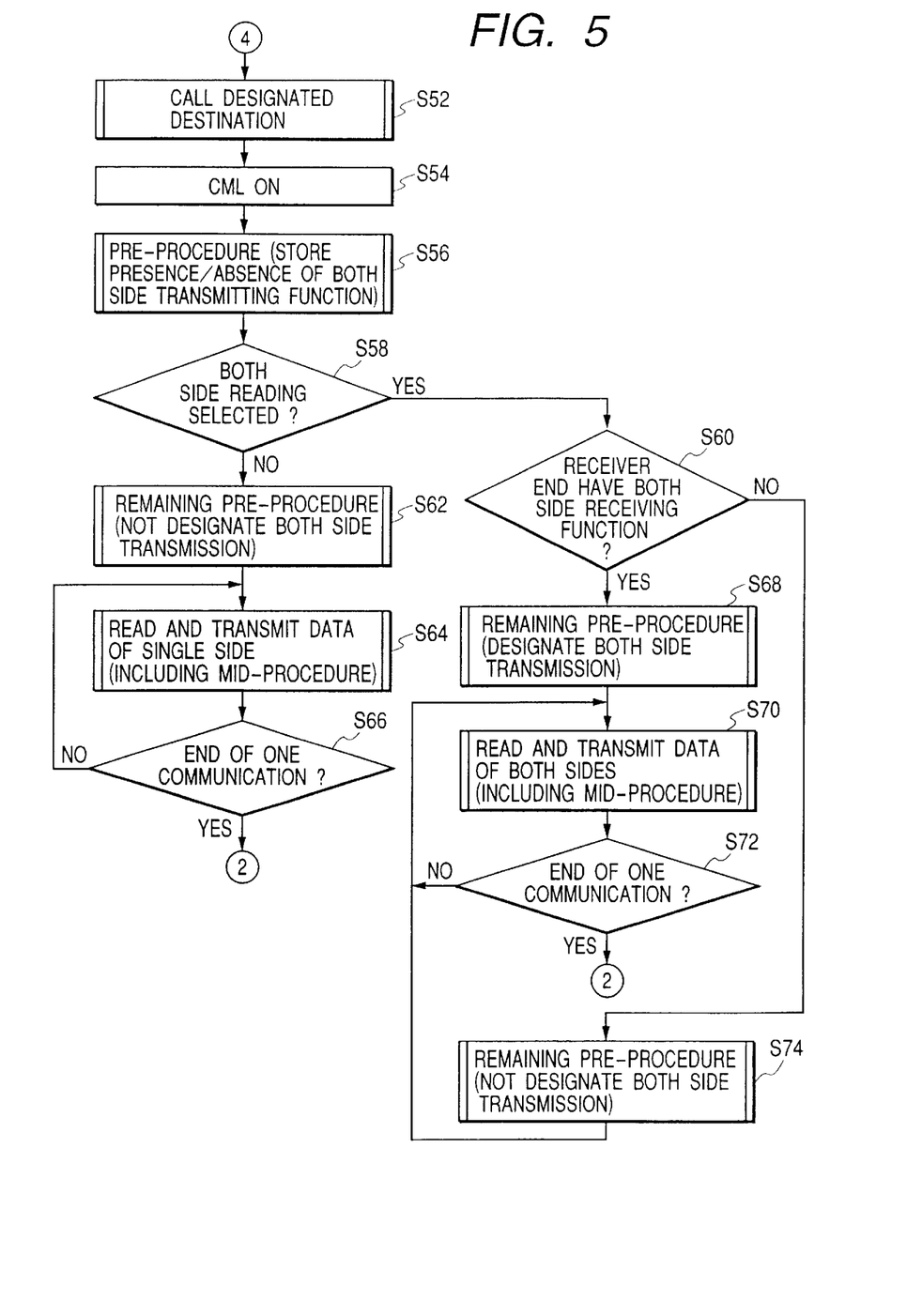
FIG. 5 is a flow chart showing operation in the first embodiment.

In step S52, the control circuit 20 calls a designated destination. In step S54, the control circuit 20 outputs a signal of signal level "1" onto the signal line 20a to turn on the CML. In step S56, the control circuit 20 executes a pre-procedure. In this procedure, the control circuit 20 stores the presence/absence of the both side transmission function on the receiver end.

In step S58, the control circuit 20 receives data on the signal line 24a to check if the both side reading mode is selected at the transmitter end. If YES in step S58, the flow advances to step S60; otherwise, the flow advances to step S62. The control circuit 20 checks in step S60 if the receiver end has the both side receiving function. If YES in step S60, the flow advances to step S68; otherwise, the flow jumps to step S74.

In step S62, the control circuit 20 executes the remaining pre-procedure. In this procedure, the control circuit 20 does not designate the both side transmission mode. In step S64, the control circuit 20 reads and transmits data on one side of image signals. This procedure includes a mid-procedure. The control circuit 20 checks in step S66 if one communication has ended. If YES in step S66, the flow returns to step S6; otherwise, the flow returns to step S64.

In step S68, the control circuit 20 executes the remaining pre-procedure. In this procedure, the control circuit 20 designates the both side transmission mode. In step S70, the control circuit 20 reads and transmits data on both sides of image signals. This step includes a mid-procedure. The control circuit 20 checks in step S72 if one communication has ended. If YES in step S72, the flow returns to step S6; otherwise, the flow returns to step S70.

In step S74, the control circuit 20 executes the remaining pre-procedure. In this procedure, the control circuit 20 does not designate the both side transmission mode. After that, the flow returns to step S70.

The aforementioned operation of the control circuit is implemented by the internal CPU of the control circuit on the basis of programs stored in the internal ROM, RAM, or the like of the control circuit. However, the present invention is not limited to this, and such programs may be stored in an external storage medium such as a floppy disk, hard disk, optical disk, CD-ROM, memory card, or the like, may be loaded into the control circuit via a dedicated reading device, and may be executed by the internal CPU of the control circuit.

The above embodiment has exemplified a stand-alone type facsimile apparatus. However, the present invention is not limited to such specific apparatus. That is, the present invention can also be applied to data communication control in a multi-functional data processing system including a copy function, an electronic filing function, and a combination of a data processing function and communication function.

As described above, according to the first embodiment, when the both side transmission mode is selected, since both side recording can be started after both side recording on one page (front and back sides) of a recording sheet is guaranteed, both side recording can be reliably made, and recording sheets can be prevented from being wasted due to interruption of recording.

Also, according to the first embodiment, when the compulsory both side recording mode is selected at the receiver end, since both side recording can be started after both side recording on one page of a recording sheet is guaranteed, both side recording can be reliably made, and recording sheets can be prevented from being wasted due to interruption of recording.

Second Embodiment

The same reference numerals in the second embodiment denote the same parts as those in the first embodiment, and a detailed description thereof will be omitted.

Figure 6:
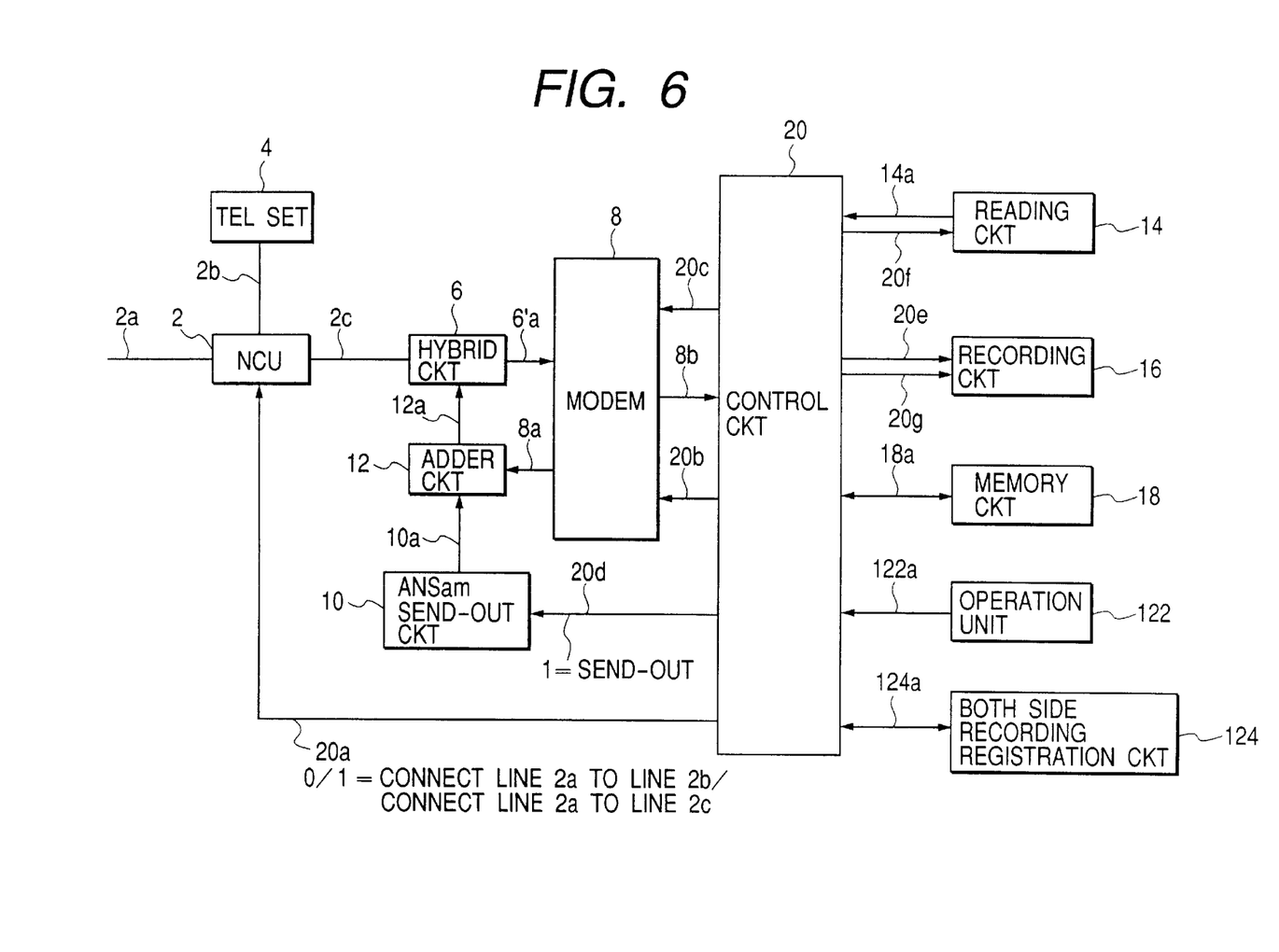
FIG. 6 is a block diagram showing the second embodiment of the present invention.

FIG. 6 is a block diagram showing the arrangement of a facsimile apparatus according to the second embodiment.

An operation unit 122 has a one-touch dial, abbreviated dial, ten-keys *·# keys, start key, set key, stop key, both side reading designation key, registration key to a both side recording registration circuit 124, other function keys, and the like, and data corresponding to the depressed key is output onto a signal line 122a.

The both side recording registration circuit 124 registers via a signal line 124a whether or not both side recording is executed.

In the second embodiment, the control circuit 20 controls the overall facsimile apparatus having the both side recording function. Especially, when the facsimile apparatus is a receiver, the control circuit 20 notifies the transmitter of the presence/absence of the both side recording function. When the facsimile apparatus is a transmitter, the control circuit 20 notifies the receiver of information as to whether the original data of interest is front or back side data. In this case, the control circuit 20 in the receiver end controls a process for changing control upon reception depending on whether or not that information is received.

More specifically, when the transmitter notifies the receiver of information as to whether the original data of interest is front or back side data, and the front and back sides are designated in turn in units of pages to be sent, the receiver starts recording upon completion of reception of data for at least two pages; when the front sides are successively designated, the receiver starts recording upon completion of reception of front and back side data for at least one page, or upon completion of a communication. When the transmitter does not notify the receiver of information as to whether the original data of interest is front or back side data, the receiver starts recording upon reception of data for at least one page.

FIGS. 7 to 12 are flow charts showing the flow of control of the control circuit 20 in the second embodiment.

Figure 7:
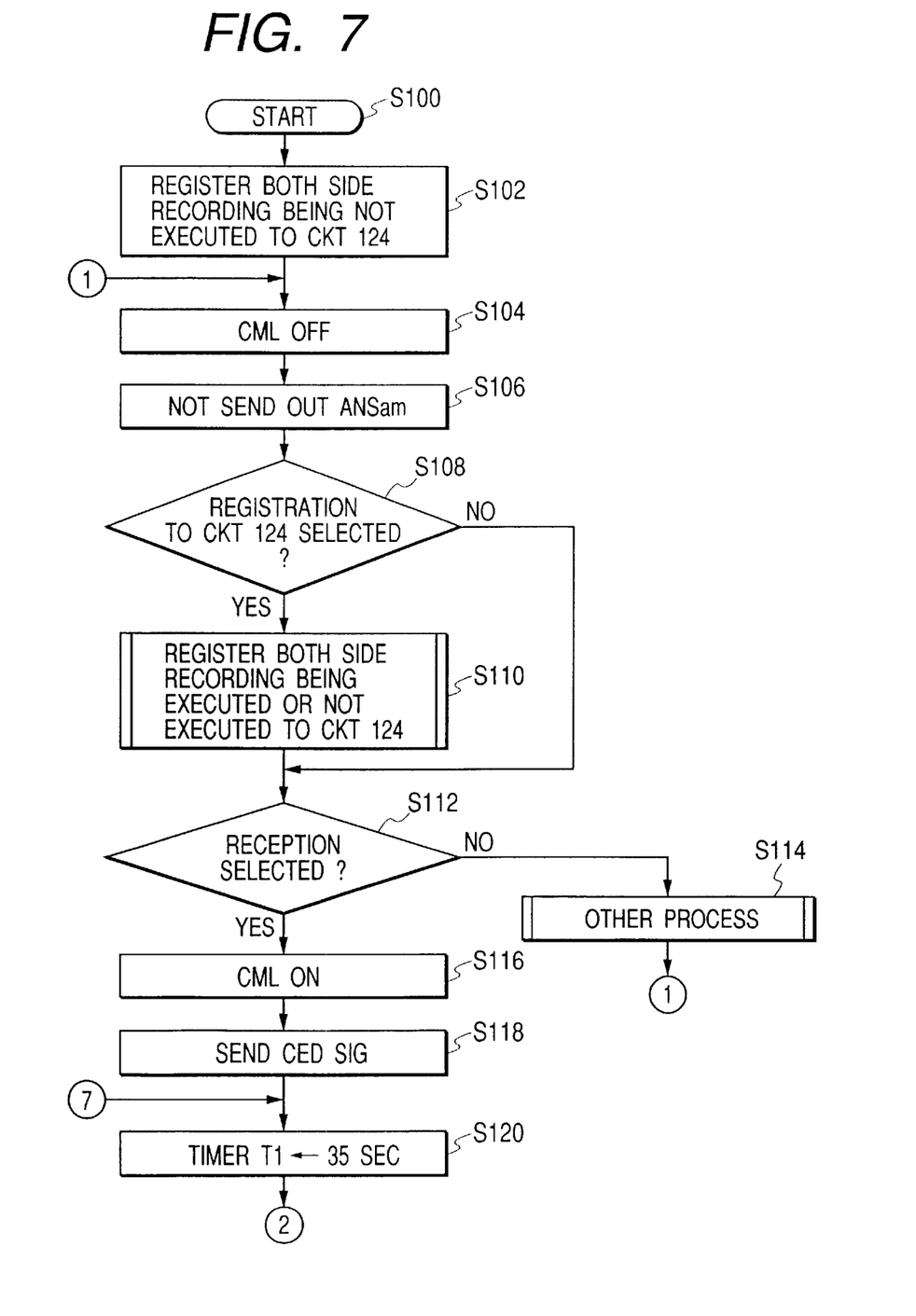
FIG. 7 is a flow chart showing operation in the second embodiment.

Referring to FIG. 7, the control circuit 20 starts operation in step S100, and registers in the both side recording function registration circuit 124 via the signal line 124a that both side recording is not executed in step S102. In step S104, the control circuit 20 outputs a signal of signal level "0" onto the signal line 20a to turn off the CML. In step S106, the control circuit 20 outputs a signal of signal level "0" onto the signal line 20d to disable sending-out of an ANSam signal.

In step S108, the control circuit 20 receives data on the signal line 122a to check if registration to the both side recording function registration circuit 124 is selected. If YES in step S108, the flow advances to step S100 to register via the signal line 124a whether or not both side recording is executed; otherwise, the flow jumps to step S112.

The control circuit 20 checks in step S112 if reception is selected. If YES in step S112, the flow advances to step S116; otherwise, the flow advances to step S114 to execute other processes.

In step S116, the control circuit 20 outputs a signal of signal level "1" onto the signal line 20a to turn on the CML. In step S118, the control circuit 20 sends a CED signal. In step S120, the control circuit 20 sets 35 sec in a timer T1.

In step S122, the control circuit 20 receives data registered in the both side recording function registration circuit 124 via the signal line 124a to check if both side recording is executed. If YES in step S122, the flow advances to step S124; otherwise, the flow jumps to step S190.

Figure 8:
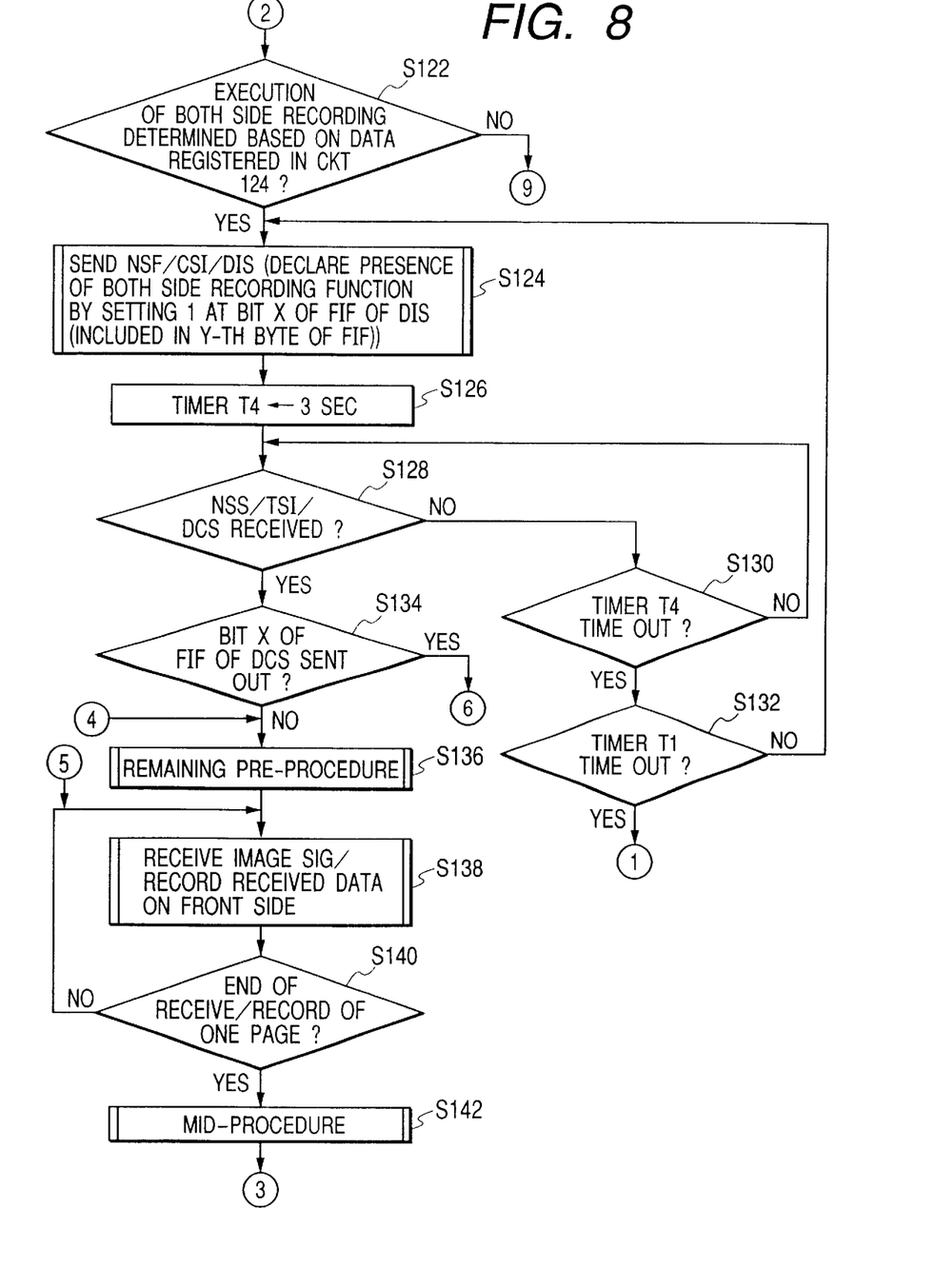
FIG. 8 is a flow chart showing operation in the second embodiment.

In step S124, the control circuit 20 sends NSF/CSI/DIS signals. In this step, the control circuit 20 sets "1" in bit X of FIF (included in the Y-th byte data in FIF) in the DIS signal to declare the presence of the both side recording function. In step S126, the control circuit 20 sets 5 sec in a timer T4.

The control circuit 20 checks in step S128 if NSS/TSI/DCS signals are received. If YES in step S128, the flow advances to step S134; otherwise, the flow advances to step S130.

The control circuit 20 checks in step S130 if the timer T4 has reached time-out. If YES in step S130, the flow advances to step S132; otherwise, the flow returns to step S128.

The control circuit 20 checks in step S132 if the timer T1 has reached time-out. If YES in step S132, the flow returns to step S104; otherwise, the flow returns to step S124.

The control circuit 20 checks in step S134 if bit X of FIF of the DCS signal is sent out. If YES in step S134, the flow jumps to step S152; otherwise, the flow advances to step S136.

Figure 9:
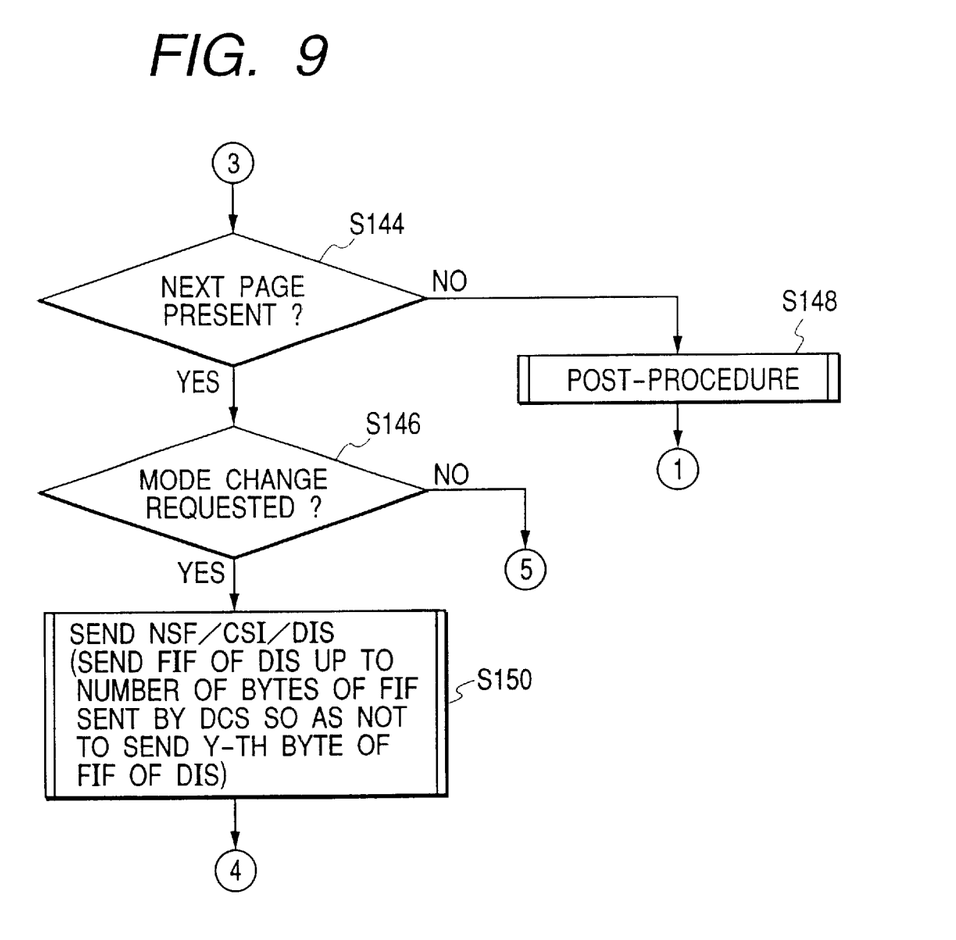
FIG. 9 is a flow chart showing operation in the second embodiment.

In step S136, the control circuit 20 executes the remaining pre-procedure. In step S138, the control circuit 20 receives and records an image signal on the front side. The control circuit 20 checks in step S140 if reception/recording for one page is complete. If NO in step S140, the flow returns to step S138; otherwise, the flow advances to step S142 to execute a mid-procedure.

The control circuit 20 checks in step S144 if the next page is present. If YES in step S144, the flow advances to step S146; otherwise, the flow advances to step S148 to execute a post-procedure, and the flow then returns to step S104.

The control circuit 20 checks in step S146 if mode change is requested. If YES in step S146, the flow advances to step S150; otherwise, the flow returns to step S138.

In step S150, the control circuit 20 sends NSF/CSI/DIS signals. In this step, the control circuit 20 sends FIF of the DIS signal up to the number of bytes of FIF sent by the DCS signal so as not to send the Y-th byte data of FIF of the DIS signal.

Figure 10:
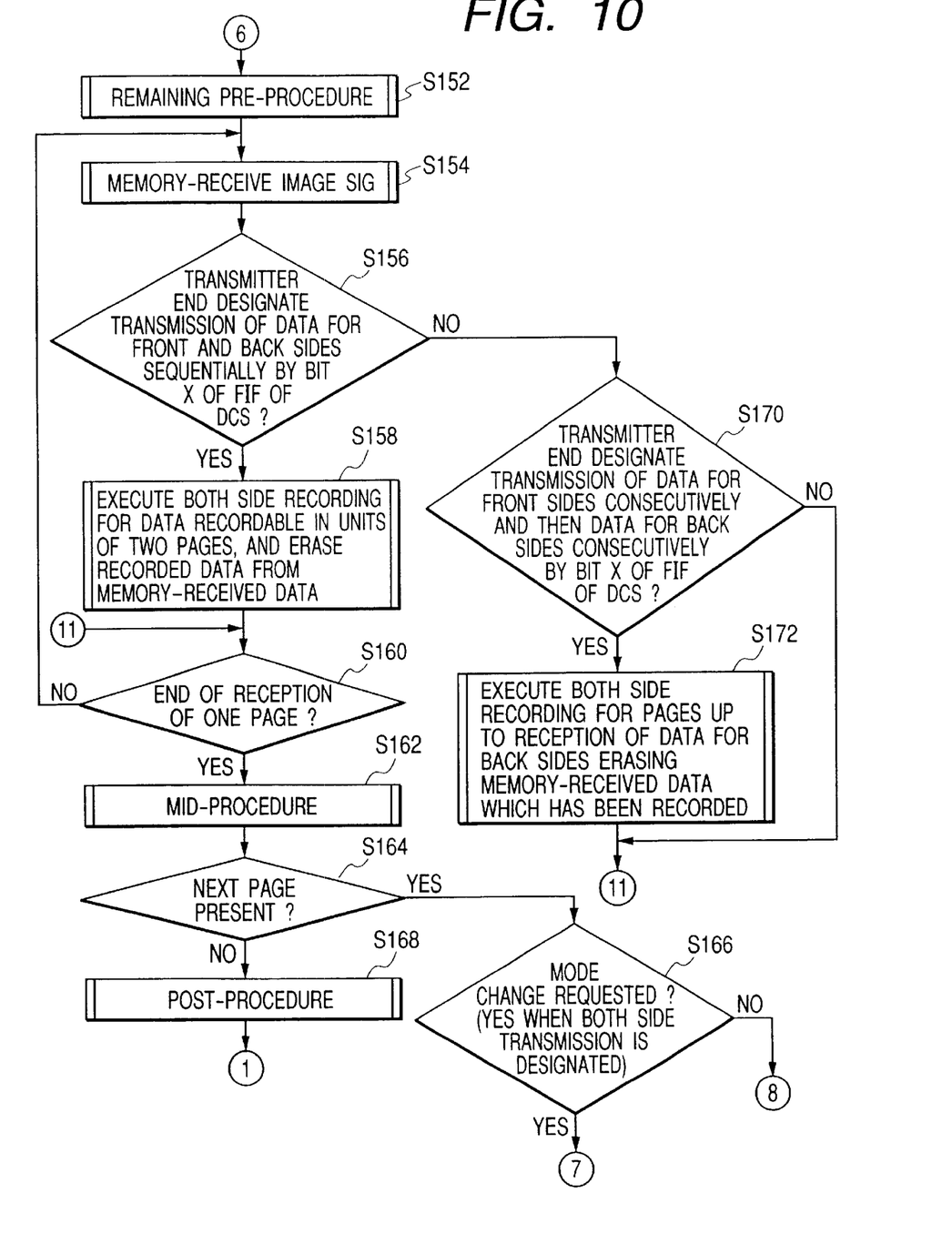
FIG. 10 is a flow chart showing operation in the second embodiment.

The control circuit 20 executes the remaining pre-procedure in step S152, and memory-receives an image signal in step S154. In step S156, the control circuit 20 checks based on bit X of FIF of the DCS signal received from the transmitter if data for the front and back sides are designated sequentially. If NO in step S156, the flow advances to step S170; otherwise, the flow advances to step S158 to execute both side recording up to data that can be recorded in units of two pages. Data that have been recorded are erased from the memory-received data, and the flow advances to step S160.

The control circuit 20 checks in step S160 if reception for one page is complete. If YES in step S160, the flow advances to step S162; otherwise, the flow returns to step S154. The control circuit 20 executes a mid-procedure in step S162, and checks in step S164 if the next page is present. If YES in step S164, the flow advances to step S166; otherwise, the flow advances to step S168. In step S168, the control circuit 20 executes a post-procedure, and the flow then returns to step S104.

The control circuit 20 checks in step S166 if mode change is requested. If YES in step S166, the flow returns to step S120; otherwise, the flow advances to step S174. When the both side transmission mode is designated, since front or back side data is designated by bit X of FIF of the DCS signal prior to transmission of data for one page, mode change is requested.

In step S170, the control circuit 20 checks based on bit X of FIF of the DCS signal from the transmitter if data for the front sides are designated consecutively, and then data for the back sides are designated consecutively. If NO in step S170 (the control rarely encounters such case, i.e., this is a "foolproof" measure), the flow returns to step S160. If YES in step S170, the flow advances to step S172 to execute both side recording for pages up to reception of data for the back sides. Data that have been recorded are erased from memory-received data, and the flow returns to step S160.

Figure 11:
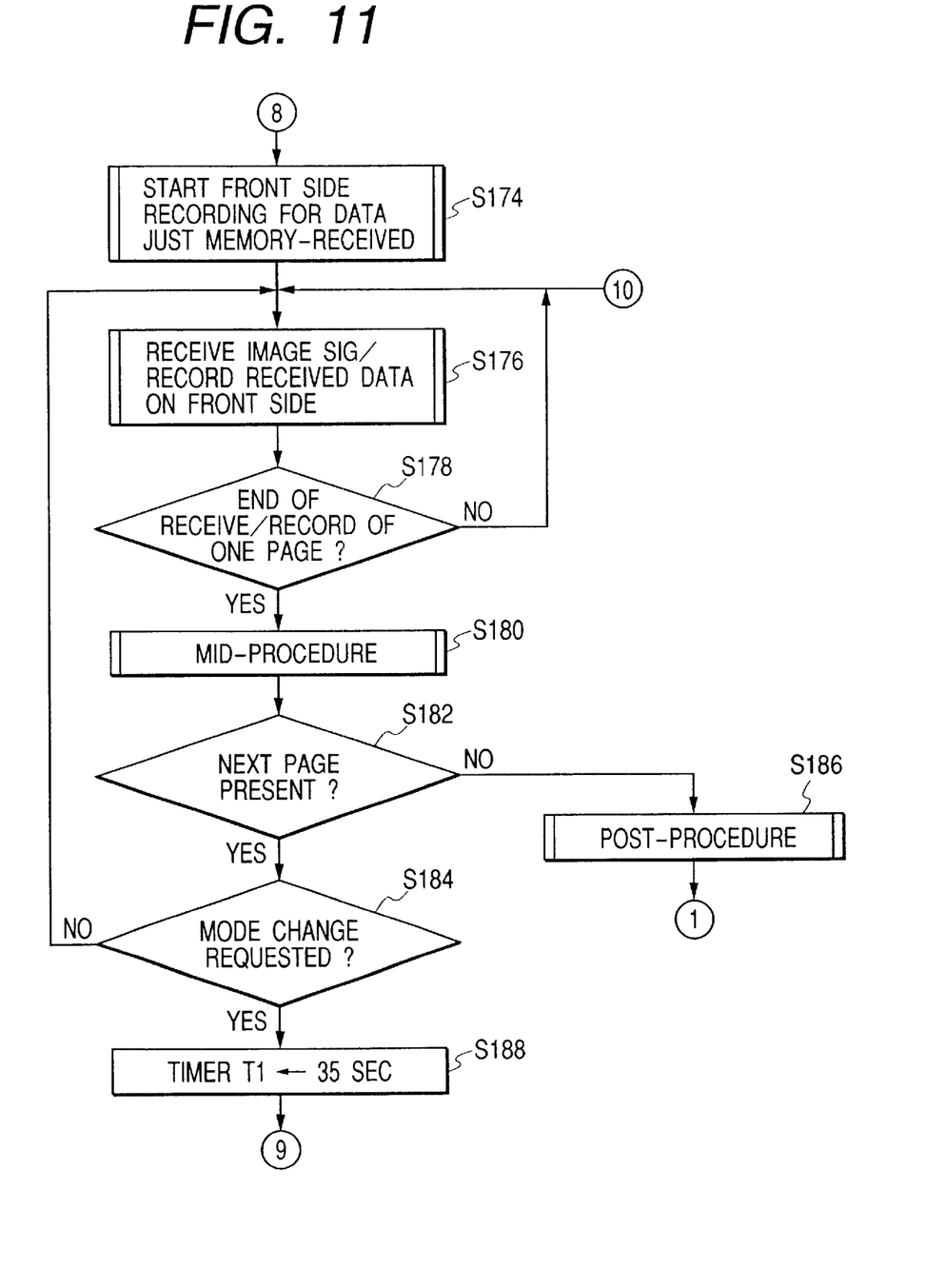
FIG. 11 is a flow chart showing operation in the second embodiment.

In step S174, the control circuit 20 starts recording the currently memory-received data on the front side. In step S176, the control circuit 20 receives an image signal and records it on the front side.

The control circuit 20 checks in step S178 if reception/recording for one page is complete. If NO in step S178, the flow returns to step S176. On the other hand, if YES in step S178, the flow advances to step S180 to execute a mid-procedure. The control circuit 20 then checks in step S182 if the next page is present. If YES in step S182, the flow advances to step S184; otherwise, the flow advances to step S186. In step S186, the control circuit 20 executes a post-procedure, and the flow returns to step S104.

Figure 12:
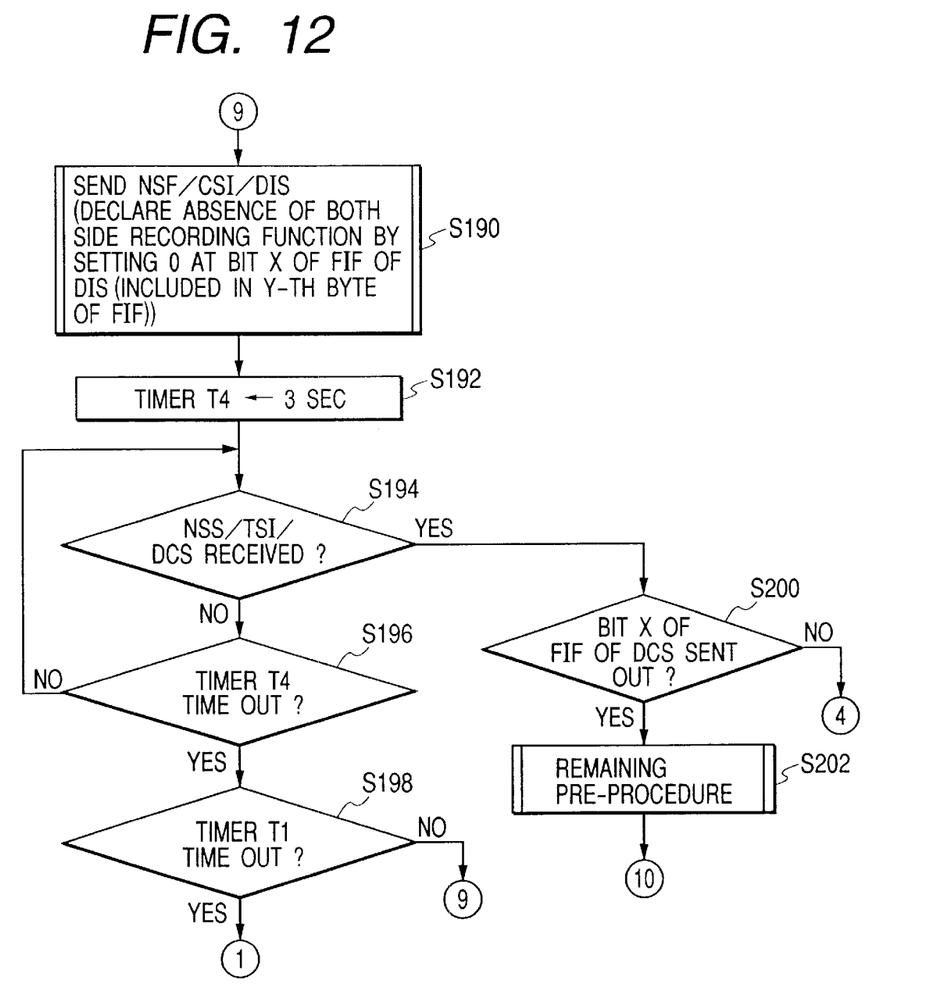
FIG. 12 is a flow chart showing operation in the second embodiment.

The control circuit 20 checks in step S184 if mode change is requested. If NO in step S184, the flow returns to step S176. On the other hand, if YES in step S184, the flow advances to step S188 to set 35 sec in the timer T1. In step S190, the control circuit 20 sends NSF/CSI/DIS signals. In this case, the control circuit 20 sets "0" at bit X of FIF (included in the Y-th byte data in FIF) of the DIS signal to declare the absence of the both side recording function.

In step S192, the control circuit 20 sets 3 sec in the timer T4. The control circuit 20 then checks in step S194 if NSS/TSI/DCS signals are received. If YES in step S194, the flow advances to step S200; otherwise, the flow advances to step S196.

The control circuit 20 checks in step S196 if the timer T4 has reached time-out. If YES in step S196, the flow advances to step S198; otherwise, the flow returns to step S194.

The control circuit 20 checks in step S198 if the timer T1 has reached time-out. If YES in step S198, the flow returns to step S104; otherwise, the flow returns to step S190.

The control circuit 20 checks in step S200 if bit X of FIF of the DCS signal is sent. If YES in step S200, the flow advances to step S202 to execute the remaining pre-procedure, and the flow then returns to step S176. On the other hand, if NO in step S200, the flow advances to step S136.

The aforementioned operation of the control circuit is implemented by the internal CPU of the control circuit on the basis of programs stored in the internal ROM, RAM, or the like of the control circuit. However, the present invention is not limited to this, and such programs may be stored in an external storage medium such as a floppy disk, hard disk, optical disk, CD-ROM, memory card, or the like, may be loaded into the control circuit via a dedicated reading device, and may be executed by the internal CPU of the control circuit.

The above embodiment has exemplified a stand-alone type facsimile apparatus. However, the present invention is not limited to such specific apparatus. That is, the present invention can also be applied to data communication control in a multi-functional data processing system including a copy function, an electronic filing function, and a combination of a data processing function and communication function.

As described above, according to the second embodiment, upon transmission of both side originals from the transmitter to the receiver, even when front side data of all pages are sent in the order of pages, and then back side data of all the pages are sent in the order of pages, the receiver end can reliably execute both side recording of the received data.

What is claimed is:

1. A facsimile apparatus with functions for both side transmission and both side recording of image data, wherein, when a transmitter end designates both side transmission of image data, recording is not started before completion of reception of at least two pages of image data of front and back sides corresponding to one sheet of recording paper, and the recording is started upon completion of reception of the two pages of image data, and wherein, when the transmitter end does not designate both side transmission, recording is started upon completion of reception of image data for at least one page.

2. An apparatus according to claim 1, wherein said apparatus comprises selection means for selecting compulsory both side recording, and, when said selection means selects compulsory both side recording, recording is not started before completion of reception of at least two pages of image data of front and back sides corresponding to one sheet of recording paper, and the recording is started upon completion of reception of the two pages of image data.

3. An apparatus according to claim 1, wherein said apparatus comprises a selection unit adapted to select compulsory both side recording, and, when said selection unit selects compulsory both side recording, recording is not started before completion of reception of at least two pages of image data of front and back sides corresponding to one sheet of recording paper, and the recording is started upon completion of reception of the two pages of image data.

4. A facsimile apparatus with a function for recording received data on both sides of a recording sheet, comprising:

notification means for notifying a transmitter of a presence/absence of a both side recording function upon receiving image data;

reception means for receiving data that is sent from the transmitter for each page and indicates whether original data of interest corresponds to front or back side data; and recording means for, when the transmitter sends data that alternately indicates front and back sides in turn in units of pages to be sent, starting recording upon reception of data for at least two pages, and for, when the transmitter sends data that consecutively indicates front sides, starting recording upon reception of back side data for at least one page.

5. An apparatus according to claim 4, wherein, when the transmitter does not notify said reception means of the data indicating whether the original data of interest corresponds to front or back side data, said recording means starts recording upon reception of data for at least one page.

6. An apparatus according to claim 5, wherein, when said reception means notifies the transmitter of the presence of the both side recording function prior to transmission of image data, the transmitter notifies said reception means of the data indicating whether the original data of interest corresponds to front or back side data, prior to transmission of each page of original data.

7. An apparatus according to claim 4, wherein, when said reception means notifies the transmitter of the presence of the both side recording function prior to transmission of image data, the transmitter notifies said reception means of the data indicating whether the original data of interest corresponds to front or back side data, prior to transmission of each page of original data.

8. A method of a facsimile apparatus with functions for both side transmission and both side recording of image data, said method comprising the steps of:

when a transmitter end designates both side transmission of image data, not starting recording before completion of reception of at least two pages of image data of front and back sides corresponding to one sheet of recording paper, wherein the recording is started upon completion of reception of the two pages of image data; and when the transmitter end does not designate both side transmission, starting recording upon completion of reception of image data for at least one page.

9. A method according to claim 8, further comprising the step of:

selecting compulsory both side recording, wherein, when compulsory both side recording is selected, recording is not started before completion of reception of at least two pages of image data of front and back sides corresponding to one sheet of recording paper, and the recording is started upon completion of reception of the two pages of image data.

10. A method of a facsimile apparatus with a function for recording received data on both sides of a recording sheet, said method comprising the steps of:

notifying a transmitter of a presence/absence of a both side recording function upon receiving image data;

receiving data that is sent from the transmitter for each page and indicates whether original data of interest corresponds to front or back side data; and when the transmitter sends data that alternately indicates front and back sides in turn in units of pages to be sent, starting recording upon reception of data for at least two pages, and, when the transmitter sends data that consecutively indicates front sides, starting recording upon reception of back side data for at least one page.

11. A method according to claim 10, wherein, when the transmitter does not notify a receiver of the data indicating whether the original data of interest corresponds to front or back side data, recording starts upon reception of data for at least one page.

12. A method according to claim 11, wherein, when the receiver notifies the transmitter of the presence of the both side recording function prior to transmission of image data, the transmitter notifies the receiver of the data indicating whether the original data of interest corresponds to front or back side data, prior to transmission of each page of original data.

13. A method according to claim 10, wherein, when a receiver notifies the transmitter of the presence of the both side recording function prior to transmission of image data, the transmitter notifies the receiver of the data indicating whether the original data of interest corresponds to front or back side data, prior to transmission of each page of original data.

14. A facsimile apparatus with a function for recording received data on both sides of a recording sheet, comprising:

a notification unit adapted to notify a transmitter of a presence/absence of a both side recording function upon receiving image data;

a reception unit adapted to receive data that is sent from the transmitter for each page and indicates whether original data of interest corresponds to front or back side data; and a recording unit adapted to, when the transmitter sends data that alternately indicates front and back sides in turn in units of pages to be sent, start recording upon reception of data for at least two pages, and to, when the transmitter sends data that consecutively indicates front sides, start recording upon reception of back side data for at least one page.

15. An apparatus according to claim 14, wherein, when the transmitter does not notify said reception unit of the data indicating whether the original data of interest corresponds to front or back side data, said recording unit starts recording upon reception of data for at least one page.

16. An apparatus according to claim 15, wherein, when said reception unit notifies the transmitter of the presence of the both side recording function prior to transmission of image data, the transmitter notifies said reception unit of the data indicating whether the original data of interest corresponds to front or back side data, prior to transmission of each page of original data.

17. An apparatus according to claim 14, wherein, when said reception unit notifies the transmitter of the presence of the both side recording function prior to transmission of image data, the transmitter notifies said reception unit of the data indicating whether the original data of interest corresponds to front or back side data, prior to transmission of each page of original data.

\* \* \* \* \*

UNITED STATES PATENT AND TRADEMARK OFFICE
CERTIFICATE OF CORRECTION

PATENT NO. : 6,433,892 B1
DATED : August 13, 2002
INVENTOR(S) : Takehiro Yoshida It is certified that error appears in the above-identified patent and that said Letters Patent is hereby corrected as shown below:

Column 6,
Line 34, "step S100" should read -- step S110 --.

Signed and Sealed this

Thirty-first Day of December, 2002

JAMES E. ROGAN
*Director of the United States Patent and Trademark Office*